(12) United States Patent
Kamihara et al.

(10) Patent No.: US 10,569,503 B2
(45) Date of Patent: Feb. 25, 2020

(54) METHOD OF MANUFACTURING STRUCTURE, AND STRUCTURE

(71) Applicant: MITSUBISHI HEAVY INDUSTRIES, LTD., Tokyo (JP)

(72) Inventors: Nobuyuki Kamihara, Tokyo (JP); Yoshiro Aoshima, Tokyo (JP); Toshio Abe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/561,166

(22) PCT Filed: Feb. 24, 2016

(86) PCT No.: PCT/JP2016/055413
§ 371 (c)(1),
(2) Date: Sep. 25, 2017

(87) PCT Pub. No.: WO2016/158102
PCT Pub. Date: Oct. 6, 2016

(65) Prior Publication Data
US 2018/0079168 A1 Mar. 22, 2018

(30) Foreign Application Priority Data
Mar. 31, 2015 (JP) .................. 2015-073320

(51) Int. Cl.
*B32B 5/26* (2006.01)
*B29C 43/20* (2006.01)
(Continued)

(52) U.S. Cl.
CPC .................. *B32B 5/26* (2013.01); *B24B 1/00* (2013.01); *B24B 7/30* (2013.01); *B29C 43/20* (2013.01);
(Continued)

(58) Field of Classification Search
CPC .... B24D 3/00; B32B 5/26; B32B 5/28; B32B 2260/023; B29C 66/02245; B29C 66/723;
(Continued)

(56) References Cited

U.S. PATENT DOCUMENTS

| 4,753,835 A | 6/1988 | Misumi et al. |
| 9,764,351 B2* | 9/2017 | Kocik ...................... B05D 1/08 |

(Continued)

FOREIGN PATENT DOCUMENTS

| CA | 2 917 127 | 1/2015 |
| JP | 59-101359 | 6/1984 |

(Continued)

OTHER PUBLICATIONS

International Search Report dated May 10, 2016 in International Application No. PCT/JP2016/055413, with English translation.

(Continued)

*Primary Examiner* — Camie S Thompson
(74) *Attorney, Agent, or Firm* — Wenderoth, Lind & Ponack, L.L.P.

(57) ABSTRACT

A method of manufacturing a structure includes: a molding step of impregnating carbon fibers with a resin material and curing the resin material for molding a carbon fiber composite material; a polishing step of polishing a polishing region on a surface of the carbon fiber composite material molded in the molding step, with an abrasive that has a predetermined hardness; and a bonding step of bonding, through an adhesive, another member to a part of the polishing region polished by the polishing step. The molding step forms, in a top layer, a polishing layer that has a hardness which is lower than the predetermined hardness, and forms a surface protective layer that is lower than the polishing layer, protects the carbon fiber composite material (Continued)

from the abrasive, and contains a protective filler having a hardness which is higher than the predetermined hardness.

9 Claims, 10 Drawing Sheets

(51) Int. Cl.
| | |
|---|---|
| B24B 1/00 | (2006.01) |
| B29C 70/06 | (2006.01) |
| B24B 7/30 | (2006.01) |
| B29C 65/00 | (2006.01) |
| B32B 5/28 | (2006.01) |
| B29C 65/48 | (2006.01) |
| B29C 69/00 | (2006.01) |
| B29L 31/30 | (2006.01) |
| B29L 31/00 | (2006.01) |

(52) U.S. Cl.
CPC ........ *B29C 65/48* (2013.01); *B29C 66/02245* (2013.01); *B29C 66/112* (2013.01); *B29C 66/131* (2013.01); *B29C 66/474* (2013.01); *B29C 66/524* (2013.01); *B29C 66/723* (2013.01); *B29C 66/7212* (2013.01); *B29C 66/7394* (2013.01); *B29C 69/00* (2013.01); *B29C 70/06* (2013.01); *B32B 5/28* (2013.01); *B29L 2031/3076* (2013.01); *B29L 2031/7172* (2013.01); *B32B 2260/023* (2013.01)

(58) Field of Classification Search
CPC ....... B29C 66/524; B29C 65/48; B29C 43/20; B29C 70/06; B29K 2307/04; B29K 2105/08; B24B 1/00; B24B 7/20; B24B 7/30; B29L 9/00
USPC ........... 264/162; 428/299.1; 451/28; 51/309, 51/308, 298
See application file for complete search history.

(56) References Cited

U.S. PATENT DOCUMENTS

| | | | |
|---|---|---|---|
| 2004/0231245 A1* | 11/2004 | Yamamoto | B24B 37/22 51/307 |
| 2009/0151985 A1 | 6/2009 | Yokouchi | |
| 2010/0178487 A1 | 7/2010 | Arai et al. | |
| 2011/0133358 A1* | 6/2011 | Barlag | B24C 1/06 264/162 |
| 2011/0147674 A1 | 6/2011 | Arai et al. | |
| 2011/0151235 A1 | 6/2011 | Arai et al. | |
| 2011/0287246 A1 | 11/2011 | Arai et al. | |
| 2011/0291056 A1 | 12/2011 | Arai et al. | |
| 2011/0297315 A1 | 12/2011 | Kishida et al. | |
| 2012/0058297 A1 | 3/2012 | Arai et al. | |
| 2014/0212620 A1 | 7/2014 | Gaw et al. | |
| 2015/0274316 A1 | 10/2015 | Kamihara et al. | |
| 2015/0353697 A9 | 12/2015 | Arai et al. | |
| 2015/0368857 A1 | 12/2015 | Arai et al. | |

FOREIGN PATENT DOCUMENTS

| | | |
|---|---|---|
| JP | 2008-55770 | 3/2008 |
| JP | 2009-146988 | 7/2009 |
| JP | 2010-194749 | 9/2010 |
| JP | 2012-197447 | 10/2012 |
| JP | 2014-86525 | 5/2014 |
| JP | 2014-145075 | 8/2014 |
| JP | 2015-16664 | 1/2015 |
| JP | 5852255 | 2/2016 |

OTHER PUBLICATIONS

Written Opinion of the International Searching Authority dated May 10, 2016 in International Application No. PCT/JP2016/055413, with English translation.

Notice of Reasons for Refusal dated Apr. 23, 2019 in Japanese Patent Application No. 2015-073320, with English Translation.

* cited by examiner

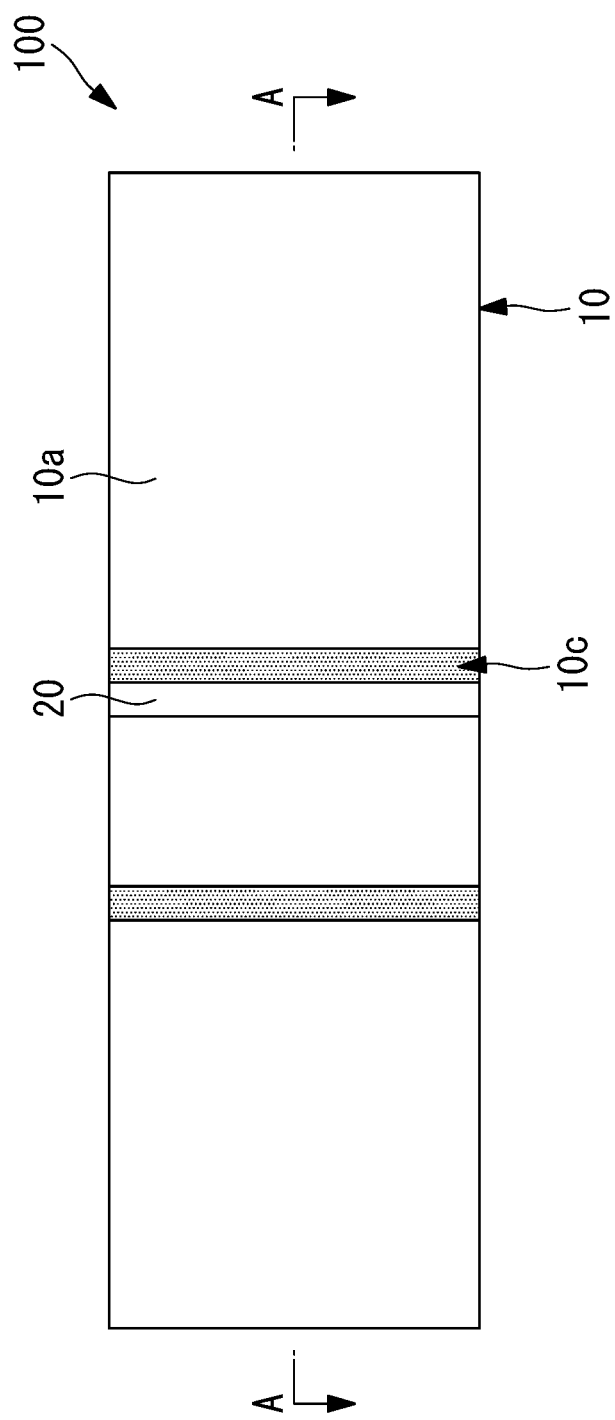

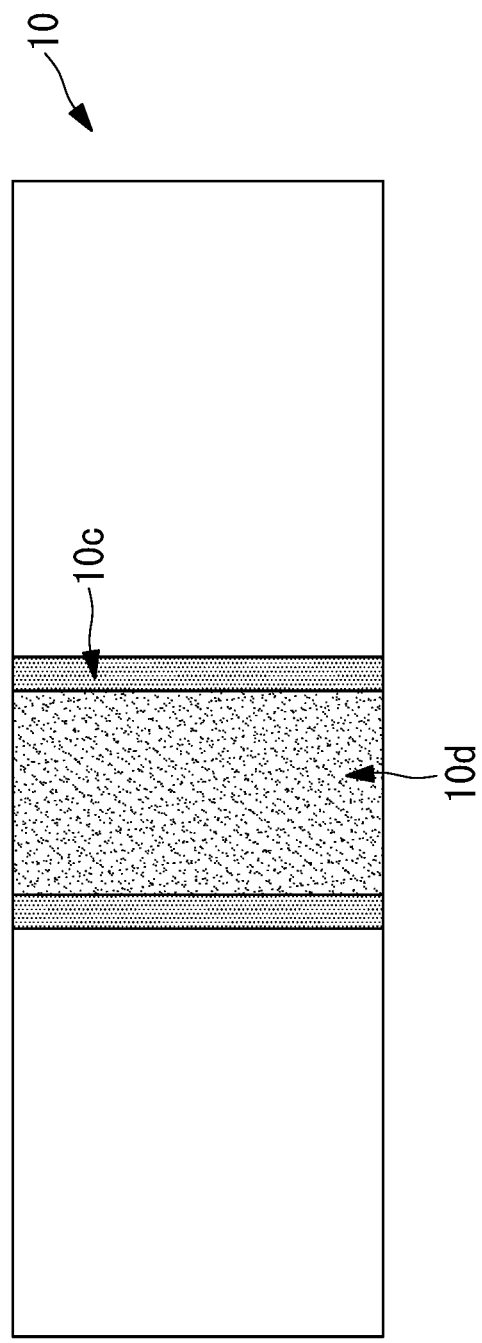

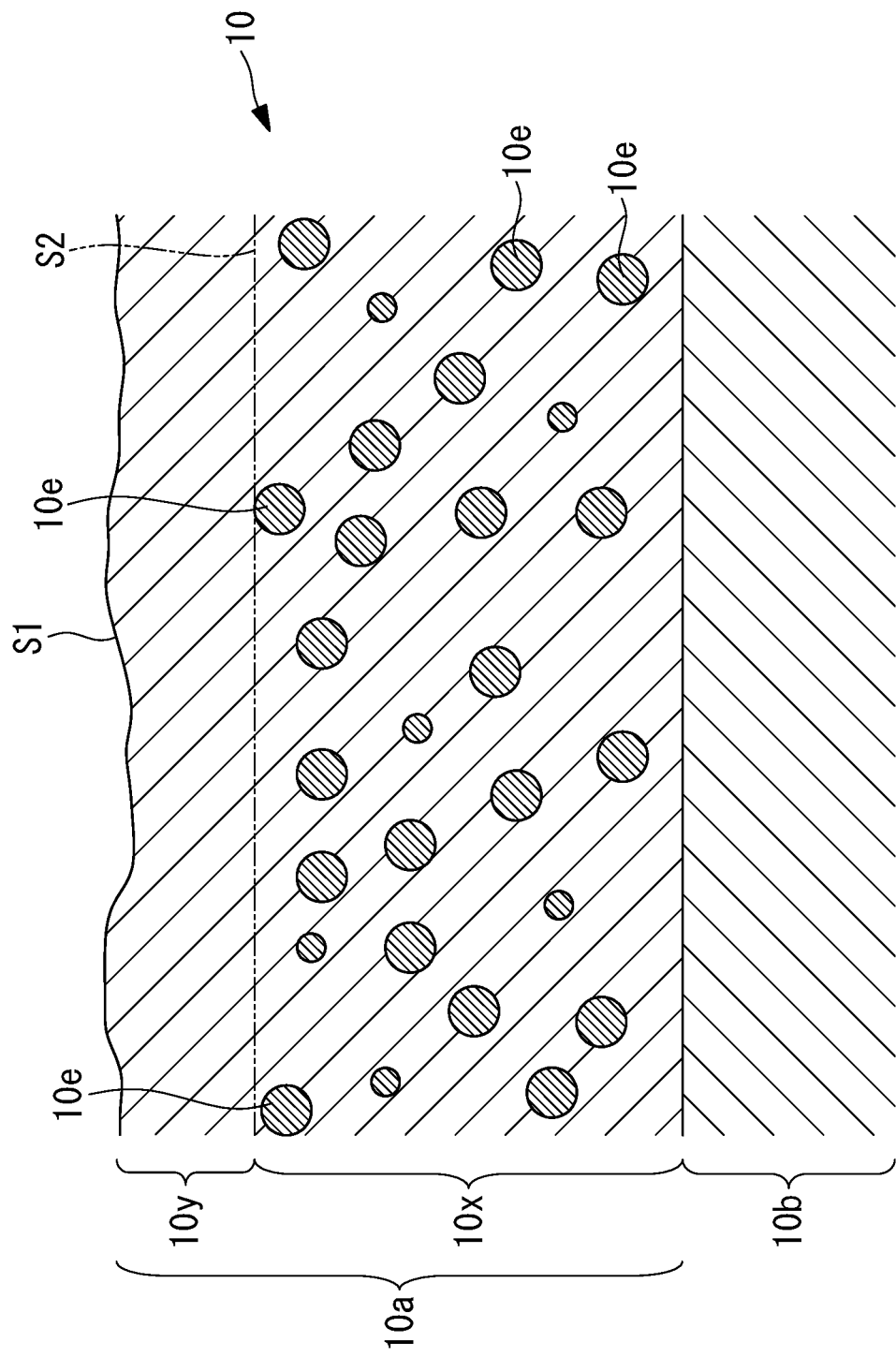

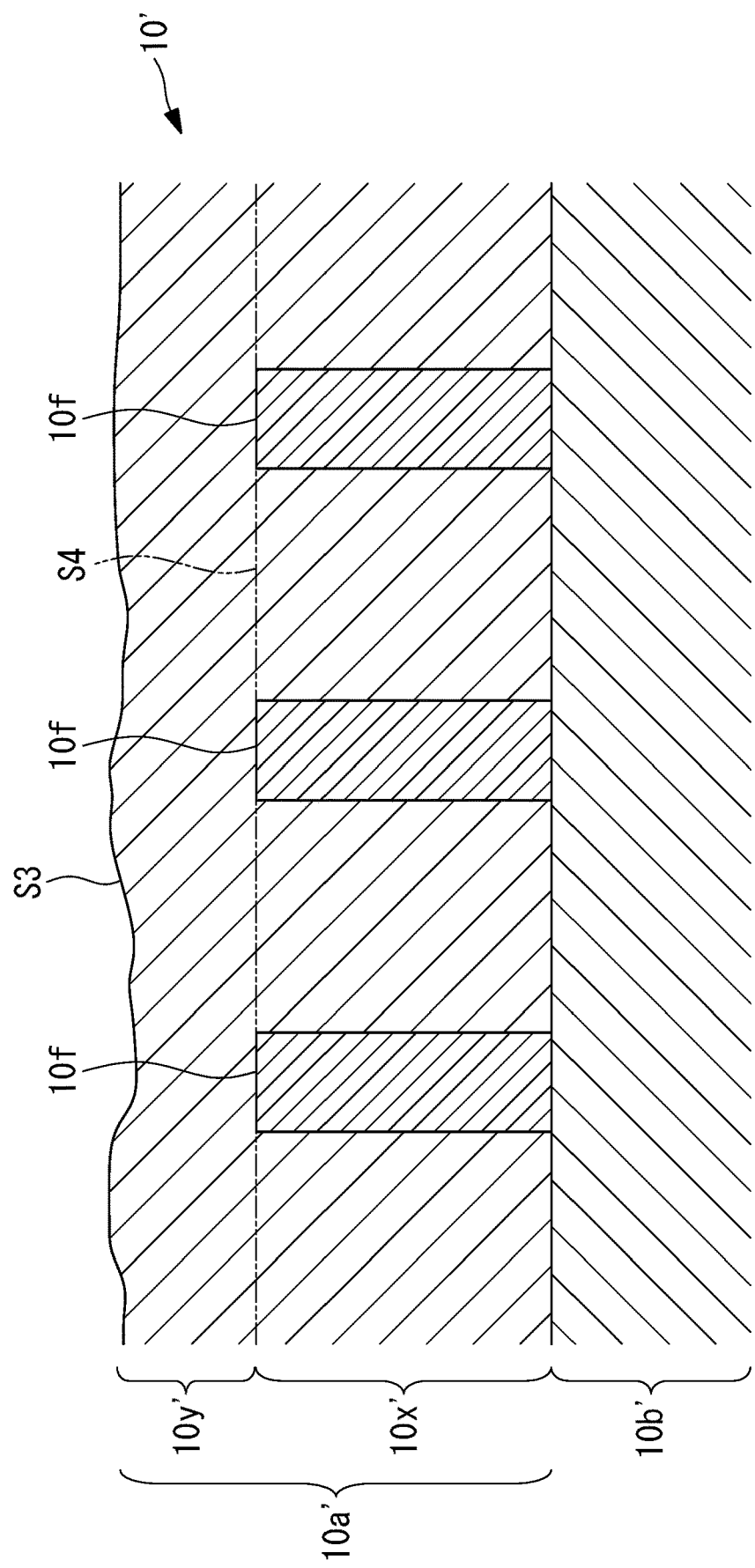

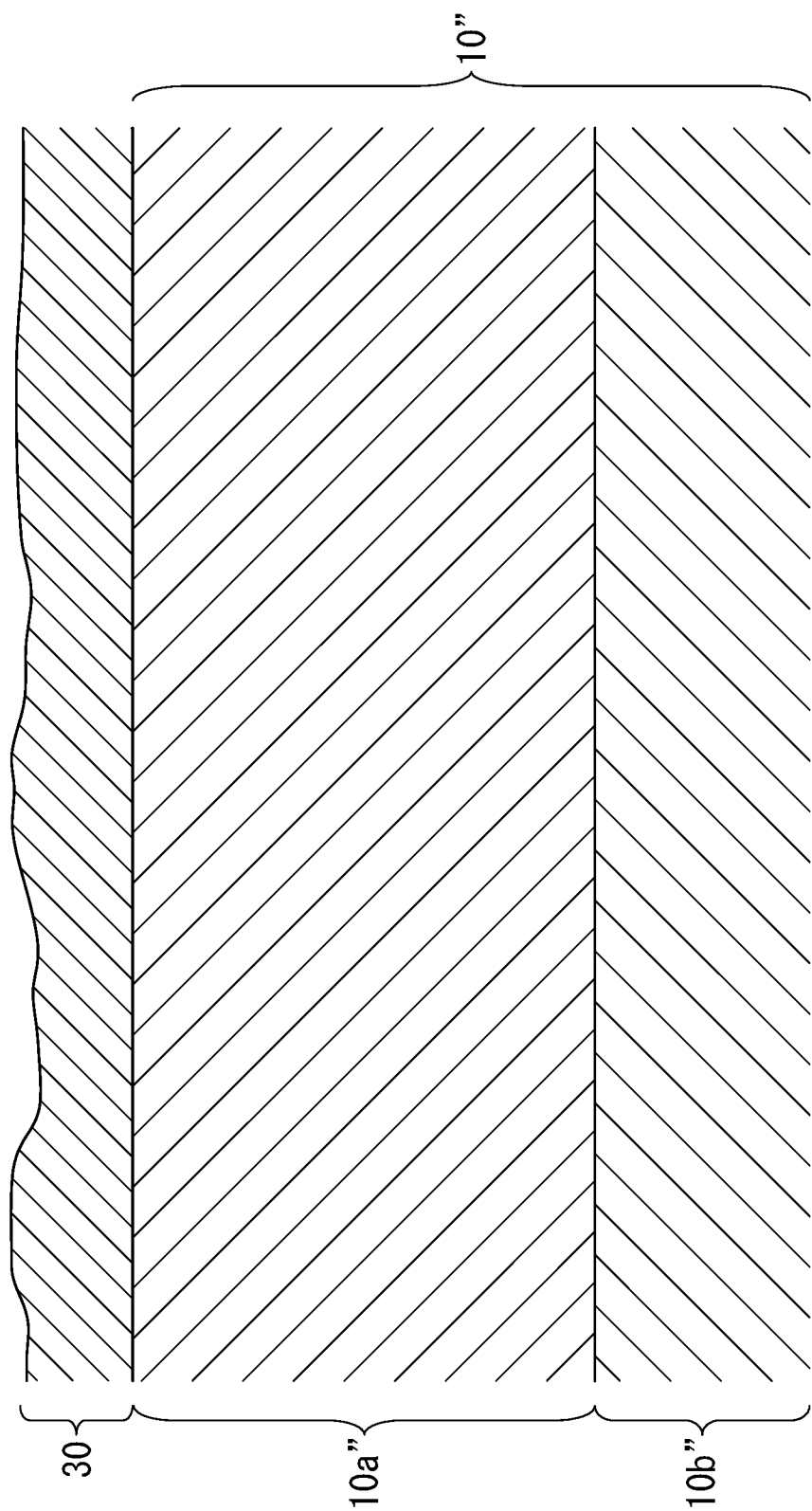

METHOD OF MANUFACTURING STRUCTURE, AND STRUCTURE

TECHNICAL FIELD

The present invention relates to a method of manufacturing a structure including a carbon fiber composite material composed of a resin material reinforced with carbon fibers, and a structure.

BACKGROUND ART

A lightweight and high-strength material with high durability has been required as an airframe material used for the main wing, the integral tank, and the like of an aircraft. For example, a lightweight metal material, such as an aluminum alloy, is used as an airframe material. In addition, with a recent increasing demand for these, a carbon fiber composite material composed of a resin material reinforced with carbon fibers has been used as an airframe material.

When another member is bonded to a carbon fiber composite material, it is preferable to polish, with an abrasive, a bonding region of the surface of the carbon fiber composite material to which the other member is to be bonded, to reduce asperities, thereby increasing the adhesion between the carbon fiber composite material and the other member. In this case, to ensure the reduction of asperities of the bonding region to which the other member is to be bonded, it is necessary to polish a region larger than the bonding region.

However, if a region larger than the bonding region is polished, a polishing region which has been polished with an abrasive after the other member is bonded to the surface of the carbon fiber composite material is partly exposed as a surface of the carbon fiber composite material.

If the surface of the carbon fiber composite material is excessively polished with an abrasive, carbon fibers are partly exposed on the surface of the carbon fiber composite material.

In this case, if lightning strikes the carbon fiber composite material, carbon fibers exposed on the surface of the carbon fiber composite material may discharge upon a dielectric breakdown, thereby causing a spark (edge glow phenomenon).

For this reason, when the surface of the carbon fiber composite material is polished with an abrasive, it is preferable to avoid exposure of carbon fibers on the surface of the carbon fiber composite material.

Japanese Unexamined Patent Application, Publication No. 2008-55770 discloses forming a second resin layer below a first resin layer formed on the surface of a fiber reinforcing resin composite material with a color different from that of the first resin layer. According to JP 2008-55770, visual checking of a change in the color of the particulate resin abrasive suppresses polishing of fibers.

However, according to JP 2008-55770, if visual checking is not accurately performed, the second resin layer is polished and fibers are exposed on the surface.

Besides, even with visual checking, there is a risk of a failure in checking a change in the color of the particulate resin abrasive due to the illuminance or the like in the environment of polishing work, so that the second resin layer may be polished and fibers may be exposed on the surface.

SUMMARY OF INVENTION

It is an object of the present invention, which has been made in view of this background, to provide a method of manufacturing a structure, and a structure that allow polishing work for polishing the surface of a carbon fiber composite material without exposing carbon fibers on the surface, to be easily performed independently of work environments and the like.

Solution to Problem

To solve the above-described problem, the present invention employs the following solutions.

A method of manufacturing a structure according to one aspect of the present invention is a method of manufacturing a structure including a carbon fiber composite material composed of a resin material reinforced with carbon fibers. The method includes: a molding step of impregnating the carbon fibers with the resin material and curing the resin material for molding the carbon fiber composite material; a polishing step of polishing a polishing region on a surface of the carbon fiber composite material molded in the molding step, with an abrasive that has a predetermined hardness; and a bonding step of bonding, through an adhesive, another member to a part of the polishing region polished by the polishing step. The molding step forms, in a top layer, a polishing layer that has hardness lower than the predetermined hardness, and forms a surface protective layer that is lower than the polishing layer, protects the carbon fiber composite material from the abrasive, and has hardness higher than the predetermined hardness.

In the method of manufacturing a structure according to one aspect of the present invention, in the molding step of molding the carbon fiber composite material, the polishing layer having hardness lower than the predetermined hardness is formed in the top layer, and the surface protective layer having hardness higher than the predetermined hardness such that the carbon fiber composite material is protected from the abrasive is formed in the layer lower than the polishing layer. Therefore, in the polishing step of polishing the polishing region in the surface of the carbon fiber composite material, the polishing layer and the surface protective layer provide appropriate protection such that abrasion of the resin material in the polishing region with the abrasive does not expose carbon fibers on the surface of the carbon fiber composite material, independently of work environments.

Thus, in the method of manufacturing a structure according to one aspect of the present invention, polishing work for polishing the surface of the carbon fiber composite material can be easily performed without exposing carbon fibers on the surface, independently of work environments and the like.

In the method of manufacturing a structure according to one aspect of the present invention, the molding step may dispose, in the carbon fiber composite material, an abrasion-resistive member that has hardness higher than the predetermined hardness, thereby forming the surface protective layer.

Thus, the abrasion-resistive member is disposed in the carbon fiber composite material so that a portion near the surface of the carbon fiber composite material can be a surface protective layer.

In the method of manufacturing a structure described above, the molding step may impregnate the resin material mixed with the abrasion-resistive member and cure the resin material, thereby molding the carbon fiber composite material, the abrasion-resistive member being particulate.

Thus, the surface protective layer formed with the particulate abrasion-resistive member in the carbon fiber composite material can provide protection such that carbon fibers are not exposed on the surface of the carbon fiber composite material in the polishing step.

In the method of manufacturing a structure described above, the molding step may dispose the abrasion-resistive member in multiple spots on the surface of the carbon fibers disposed in the polishing region and cure the resin material, thereby forming the carbon fiber composite material, the abrasion-resistive member being columnar.

Thus, the surface protective layer formed with the abrasion-resistive member in multiple spots on the surface of the carbon fibers can provide protection such that carbon fibers are not exposed on the surface of the carbon fiber composite material in the polishing step.

A method of manufacturing a structure according to one aspect of the present invention includes a carbon fiber composite material composed of a resin material reinforced with carbon fibers. The method includes: a molding step of impregnating the carbon fibers with the resin material and curing the resin material for molding the carbon fiber composite material; a polishing step of polishing a polishing region on a surface of the carbon fiber composite material molded in the molding step, with an abrasive that has a predetermined hardness; a bonding step of bonding, through an adhesive, another member to a part of the polishing region polished by the polishing step. The molding step forms, in a top layer, a non-conductive layer for protecting the carbon fiber composite material from the abrasive.

In the method of manufacturing a structure according to one aspect of the present invention, in the molding step of molding the carbon fiber composite material, the non-conductive layer that protects the carbon fiber composite material from the abrasive is formed on in the top layer. Therefore, in the polishing step of polishing the polishing region in the surface of the carbon fiber composite material, the resin material in the polishing region is not polished as long as the non-conductive layer remains, so that appropriate protection is made such that the carbon fibers are not exposed on the surface of the carbon fiber composite material.

In the method of manufacturing a structure according to one aspect of the present invention, the non-conductive layer may be a layer molded with a glass fiber composite material that is a resin material reinforced with glass fibers.

Thus, a glass fiber composite material reinforced with glass fibers serves as a non-conductive layer, so that protection can be made such that the carbon fibers are not exposed on the surface of the carbon fiber composite material in the polishing step.

In the method of manufacturing a structure according to one aspect of the present invention, the predetermined hardness may be higher than the hardness of the resin material contained in the carbon fiber composite material formed in the molding step.

Thus, the resin material portion of the surface of the carbon fiber composite material is polished with the abrasive having higher hardness than the resin material, so that the surface protective layer can provide protection such that carbon fibers are not exposed on the surface of the carbon fiber composite material in the polishing step.

A structure according to one aspect of the present invention is formed with a carbon fiber composite material that is a resin material reinforced with carbon fibers and polished with an abrasive with a predetermined hardness. The structure includes: a polishing layer that is formed in a top layer and has hardness lower than the predetermined hardness; a surface protective layer that is lower than the polishing layer, protects the carbon fiber composite material from the abrasive, and has hardness higher than the predetermined hardness; and a carbon fiber layer composed of the cured resin material containing the carbon fibers therein.

The structure according to one aspect of the present invention allows polishing work for polishing the surface of a carbon fiber composite material without exposing carbon fibers on the surface, to be easily performed independently of work environments and the like.

Advantageous Effects of Invention

The present invention can provide a method of manufacturing a structure, and a structure that allow polishing work for polishing the surface of a carbon fiber composite material without exposing carbon fibers on the surface, to be easily performed independently of work environments and the like.

BRIEF DESCRIPTION OF DRAWINGS

FIG. 1A is a diagram showing a plan view of a structure including a carbon fiber composite material.

FIG. 4B is a diagram showing a bonding region of the surface of the carbon fiber composite material.

FIG. 5 is a cross-sectional view of a resin layer of a carbon fiber composite material according to the first embodiment.

FIG. 6 is a cross-sectional view of a resin layer of a carbon fiber composite material according to the second embodiment.

FIG. 7 is a cross-sectional view of a resin layer of a carbon fiber composite material and a glass fiber composite material according to the third embodiment.

DESCRIPTION OF EMBODIMENTS

First Embodiment

Figure 1B:
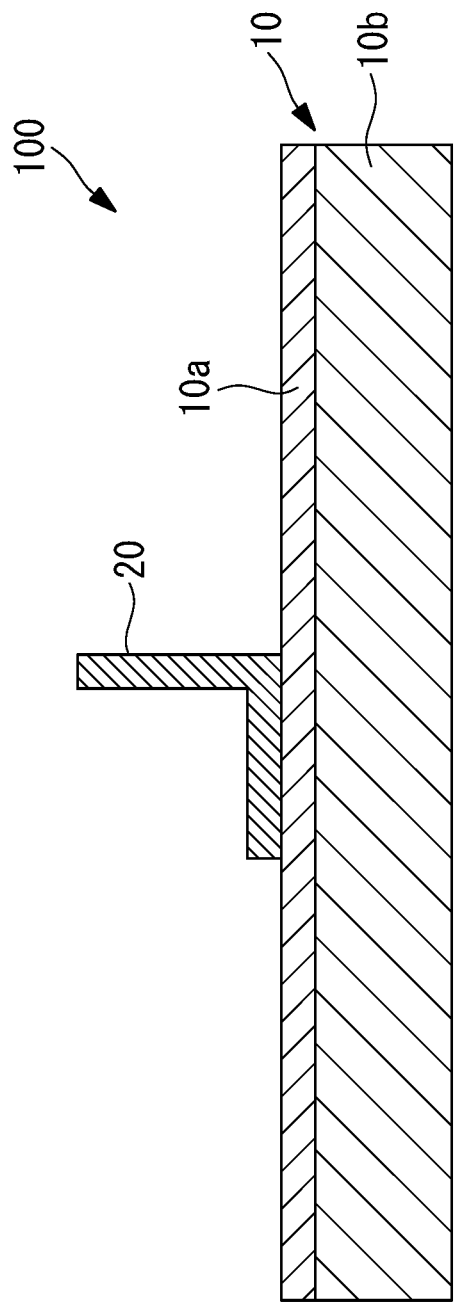
FIG. 1B is a diagram showing a cross-sectional view of a structure including a composite material along line A-A in FIG. 1A.

A method of manufacturing a structure 100 according to the first embodiment of the present invention will now be described with reference to the drawings.

As shown in FIG. 1A, the structure 100, which is manufactured by a manufacturing method of this embodiment, includes a plate-like carbon fiber composite material 10 and a support member 20 (another member) which is bonded to a polishing region 10c of the surface of the carbon fiber composite material 10 through an adhesive (not shown in the drawing).

As shown in FIG. 1B, the carbon fiber composite material 10 of the structure 100 includes a resin layer 10a disposed in the surface portion, and a carbon fiber layer 10b composed of a resin material containing carbon fibers.

Further, as shown in FIGS. 1A and 1B, the support member 20 has an L-shape cross section.

The carbon fiber composite material 10 is a carbon fiber reinforced plastic (CFRP) which is a resin material reinforced with carbon fibers. The resin material may be, for example, a thermosetting resin, such as an unsaturated polyester or epoxy resin, or a thermoplastic resin, such as polyether ether ketone (PEEK).

The carbon fiber composite material 10 has carbon fibers as a reinforcing material and the carbon fibers have conductivity. Therefore, if carbon fibers are exposed on the surface of the carbon fiber composite material 10, a stroke current from lightning striking the carbon fiber composite material 10 flows through carbon fibers and is released due to a dielectric breakdown between carbon fibers or edges of carbon fibers cut by polishing, which may cause a spark.

For this reason, the method of manufacturing the structure 100 according to this embodiment prevents carbon fibers from being exposed on the surface of the carbon fiber composite material 10 in the polishing step of polishing the surface of the carbon fiber composite material 10.

The structure 100 is used, for example, as an integral tank which is a fuel tank integrated with the main wing of an aircraft with a wing structure that is a sealed structure that does not leak a liquid fuel. In this case, the support member 20 is used as a member for supporting the carbon fiber composite material 10 in the main wing. In addition, the resin layer 10*a* of the carbon fiber composite material 10 is a portion in contact with the liquid fuel in the integral tank.

A method of manufacturing the structure 100 according to this embodiment will now be described.

Figure 2:
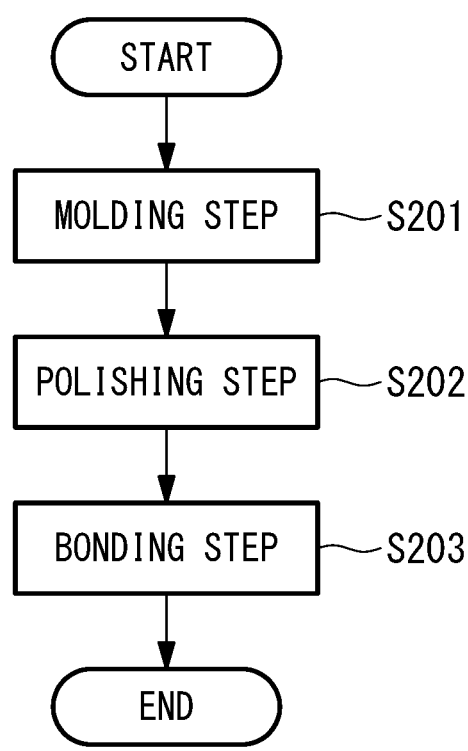
FIG. 2 is a flow chart of a process for manufacturing a structure including a carbon fiber composite material.

As shown in the flow chart of FIG. 2, the method of manufacturing the structure 100 according to this embodiment includes a molding step (S201) of molding the carbon fiber composite material 10, a polishing step (S202) of polishing the surface of the carbon fiber composite material 10 molded by the molding step (S201), and a bonding step (S203) of bonding the support member 20 to the surface of the carbon fiber composite material 10 polished in the polishing step (S202).

In the molding step (S201) multiple sheet-like prepregs composed of carbon fibers impregnated with a resin material are stacked, pressurized, and heated to cure the multiple prepregs for integration.

Figure 3A:
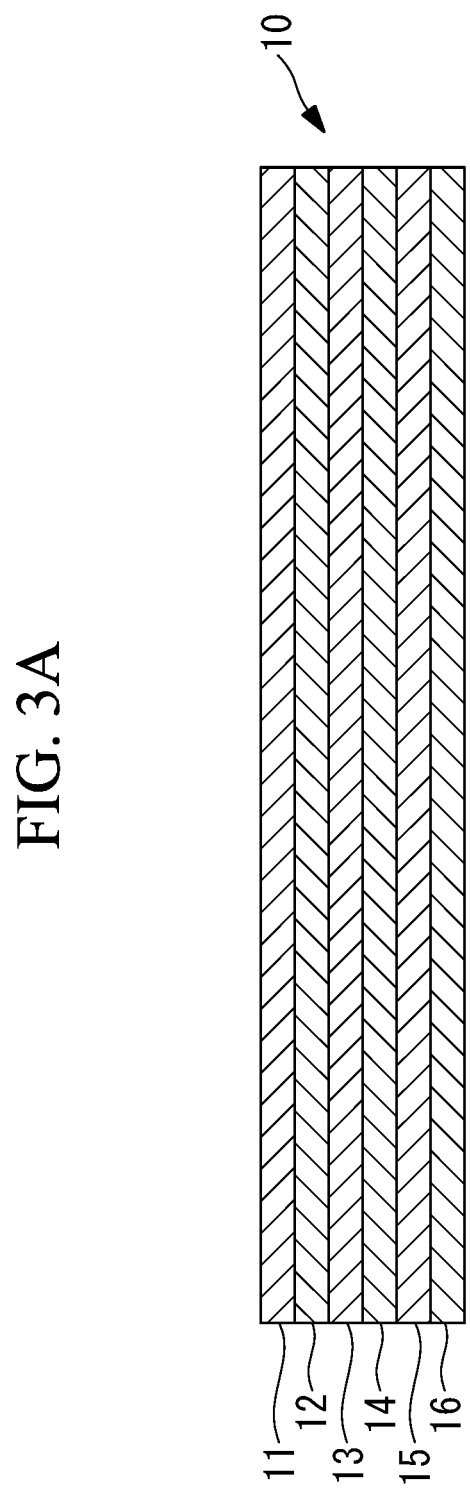
FIG. 3A is a cross-sectional view of carbon fiber composite material showing the state before pressurization and heating.

FIG. 3A is a cross-sectional view showing the state where sheet-like prepregs 11, 12, 13, 14, 15, and 16 composed of carbon fibers impregnated with a resin material are stacked in the molding step.

Figure 3B:
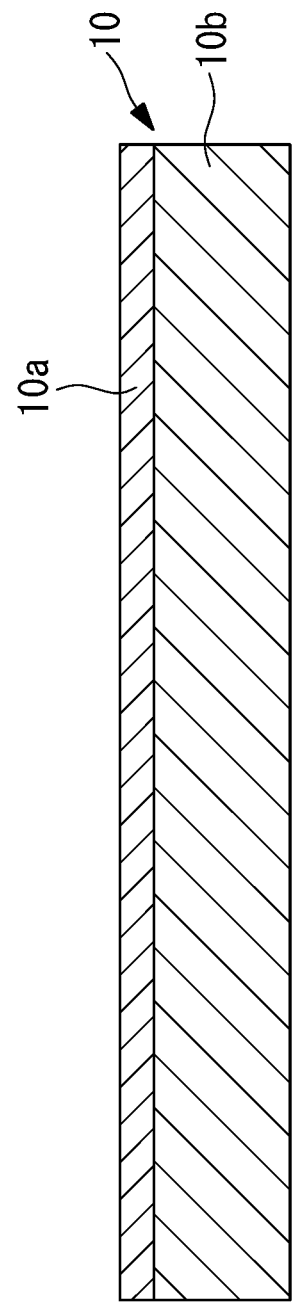
FIG. 3B is a cross-sectional view of carbon fiber composite material showing the state after pressurization and heating.

FIG. 3B is a cross-sectional view of the carbon fiber composite material 10 after pressurization and heating of the stack of sheet-like prepregs 11, 12, 13, 14, 15, and 16 in the molding step.

In FIG. 3B, the resin layer 10*a* is a deposition of the resin material soaking out of the prepregs 11, 12, 13, 14, 15, and 16 upon curing by pressurization and heating of the thermosetting resin material. Meanwhile, the carbon fiber layer 10*b* is composed of the cured resin material remaining around the carbon fibers without soaking as the resin layer 10*a*, and containing carbon fibers.

It should be noted that the top layer in the resin layer 10*a* is a resin film (not shown in the drawing) that is stacked on the top surface of the prepreg 11 before curing of the resin material by pressurization and heating and that is integrated with the prepreg 11 by heating.

In the polishing step (S202), the polishing region 10*c* in the surface of the carbon fiber composite material 10 molded in the molding step (S201) is polished with an abrasive having a predetermined hardness.

Figure 4A:
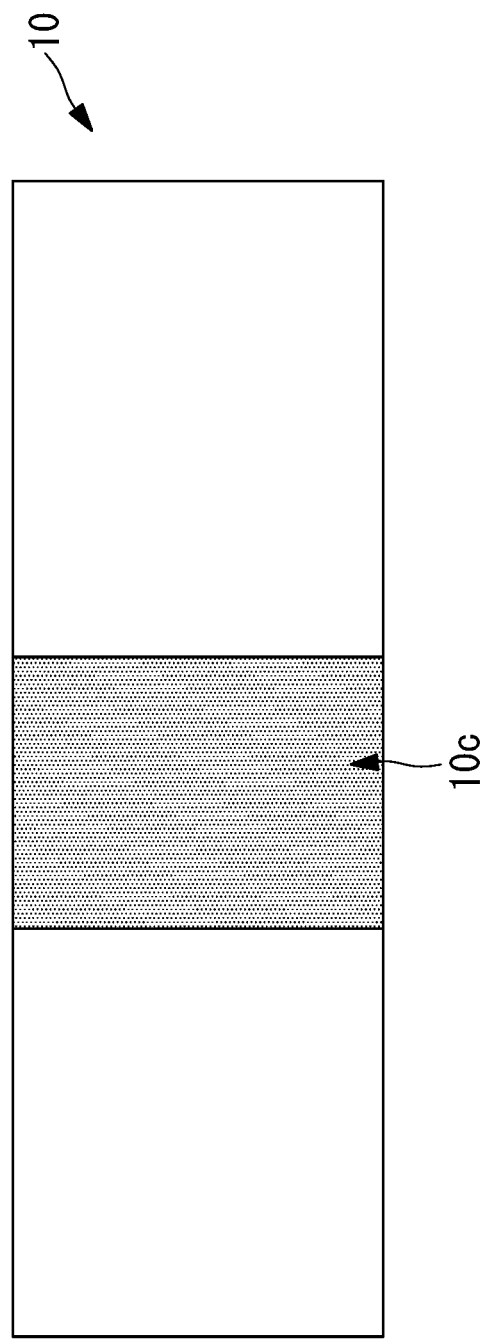
FIG. 4A is a diagram showing a polishing region of the surface of the carbon fiber composite material.

FIG. 4A shows the polishing region 10*c* in the surface of the carbon fiber composite material 10. The abrasive may be any abrasive in which abrasive grains having a predetermined hardness are bonded to a base material (e.g., paper, a cloth, or a resin). In addition, for polishing with an abrasive, a disc grinder or other grinders that rotate a disc-like abrasive can be used.

It should be noted that the hardness of the abrasive grains in the abrasive is higher (Mohs hardness: 3-4) than that of the resin material portion of the resin layer 10*a*. For this reason, polishing the resin layer 10*a* with an abrasive cuts away the resin material portion of the resin layer 10*a*.

In the bonding step (S203), the support member 20 is bonded, through an adhesive, to a bonding region 10*d* which is a part of the polishing region 10*c* in the surface of the carbon fiber composite material 10 polished in the polishing step (S202).

FIG. 4B shows the polishing region 10*c* in the surface of the carbon fiber composite material 10 and the bonding region 10*d* which is a part thereof. As shown in FIG. 4B, the polishing region 10*c* is larger than the bonding region 10*d*. This is because the polishing region 10*c* which is larger than the bonding region 10*d* needs to be polished in order to ensure the reduction of asperities in the bonding region 10*d* to which the support member 20 is to be bonded.

As described above, the polishing region 10*c* in the surface of the carbon fiber composite material 10 is larger than the bonding region 10*d* to which the support member 20 is to be bonded. Therefore, as shown in FIG. 4B, in the structure 100 in which the support member 20 is bonded to the bonding region 10*d*, a part of the polishing region 10*c* (the portion other than the area to which the support member 20 is to be bonded) is exposed on the surface.

If this polishing region 10*c* exposed on the surface is excessively polished in the polishing step and carbon fibers are exposed on the surface, the carbon fibers may discharge due to a dielectric breakdown, causing a spark.

For this reason, in this embodiment, to prevent the polishing region 10*c* from being excessively polished in the polishing step (S202) and carbon fibers from being exposed on the surface, a protective filler 10*e* that has higher hardness than the abrasive is disposed in the resin layer 10*a* of the carbon fiber composite material 10.

FIG. 5 is a cross-sectional view showing the resin layer 10*a* and the carbon fiber layer 10*b* of the carbon fiber composite material 10 according to the first embodiment.

As shown in FIG. 5, the resin layer 10*a* of the carbon fiber composite material 10 according to this embodiment is composed of a surface protective layer 10*x* that contains a particulate protective filler 10*e* (an abrasion-resistive member), and a polishing layer 10*y* that does not contain the protective filler 10*e*. The protective filler 10*e* is composed of particles that have higher hardness than the abrasive grains in the abrasive. The grain size of the protective filler 10*e* is preferably in the range of 20 μm to 40 μm.

For example, when glass (Mohs hardness: 5-6) is used as abrasive grains for the abrasive, quartz (Mohs hardness: 7), aluminum nitride (Mohs hardness: 8), silicon carbide (Mohs hardness: 9.8) or the like that has higher hardness than glass can be used as the protective filler 10*e*. In addition, when quartz (Mohs hardness: 7) is used as abrasive grains for the abrasive, aluminum nitride (Mohs hardness: 8), silicon carbide (Mohs hardness: 9.8) or the like that has higher hardness than quartz can be used as the protective filler 10*e*. In addition, when aluminum nitride (Mohs hardness: 8) is used as abrasive grains for the abrasive, silicon carbide (Mohs hardness: 9.8) or the like that has higher hardness than aluminum nitride can be used as the protective filler 10e.

To form the surface protective layer 10x containing the protective filler 10e shown in FIG. 5, a mixture of a resin material, which is to be impregnated into carbon fibers, and the protective filler 10e is used for the prepreg 11 stacked before pressurization and heating in the molding step (S201).

Thus, the protective filler 10e is mixed into the resin material soaked out of the prepreg 11 due to pressurization and heating in the molding step (S201), and the resin material is then cured. Accordingly, the surface protective layer 10x is formed in which the resin layer 10a of the carbon fiber composite material 10 molded in the molding step (S201) contains the protective filler 10e.

Further, to form the polishing layer 10y in the top layer, a resin film (not shown in the drawing) is stacked on the top surface of the prepreg 11 before pressurization and heating in the molding step (S201).

As described above, in the molding step (S201), the polishing layer 10y polished for increasing adhesion is formed in the top layer, and the surface protective layer 10x containing the protective filler 10e that has higher hardness than the abrasive is lower than the polishing layer 10y such that the carbon fiber composite material 10 is protected from the abrasive.

Even if the carbon fiber composite material 10 including the resin layer 10a shown in FIG. 5 is polished with an abrasive that has lower hardness than the protective filler 10e in the polishing step, the protective filler 10e contained in the surface protective layer 10x suppresses excessive abrasion of the resin layer 10a.

For example, when the resin layer 10a having a surface S1 with asperities as shown in FIG. 5 is polished with an abrasive, the abrasive comes into contact with the protective filler 10e when abrasion reaches a surface S2 (the surface of the surface protective layer 10x). This further suppresses excessive abrasion of the resin layer 10a.

A resin material mixed with the protective filler 10e is used for the prepreg 11 disposed adjacent to the top surface (the surface to which the support member 20 is to be bonded) of the carbon fiber composite material 10 in the above description, which is not necessarily the case. A resin material mixed with the protective filler 10e may be used for the prepreg 11 and the prepreg 12. Further, a resin material mixed with the protective filler 10e may be used for the prepregs 13, 14, 15, and 16.

The actions and effects provided by the aforementioned method of manufacturing the structure 100 according to this embodiment will be described.

In the method of manufacturing a structure according to this embodiment, in the molding step (S201) of molding the carbon fiber composite material 10, the polishing layer 10y having hardness lower than that of the abrasive is formed in the top layer, and the surface protective layer 10x containing the particulate protective filler 10e (abrasion-resistive member) having hardness higher than the hardness of the abrasive such that the carbon fiber composite material 10 is protected from the abrasive is formed in a layer lower than the polishing layer 10y.

Therefore, in the polishing step (S202) of polishing the polishing region 10c in the surface of the carbon fiber composite material 10, the polishing layer 10y and the surface protective layer 10x provide appropriate protection such that abrasion of the resin material in the polishing region with the abrasive does not expose carbon fibers on the surface of the carbon fiber composite material 10, independently of work environments.

Thus, in the method of manufacturing a structure according to this embodiment, polishing work for polishing the surface of the carbon fiber composite material 10 can be easily performed without exposing carbon fibers on the surface, independently of work environments and the like.

In the method of manufacturing the structure according to this embodiment, the molding step (S201) cures the prepreg 11 impregnated with a resin material mixed with the particulate protective filler 10e and molds the carbon fiber composite material 10.

Thus, the surface protective layer 10x formed with the particulate protective filler 10e in the carbon fiber composite material 10 can provide protection such that carbon fibers are not exposed on the surface of the carbon fiber composite material 10 in the polishing step (S202).

In the method of manufacturing a structure according to this embodiment, the abrasive has hardness higher than that of the resin material contained in the carbon fiber composite material 10 formed in the molding step (S201).

Thus, the resin material portion of the surface of the carbon fiber composite material 10 is polished with the abrasive having higher hardness than the resin material, so that the surface protective layer 10x can provide protection such that carbon fibers are not exposed on the surface of the carbon fiber composite material 10 in the polishing step (S202).

Second Embodiment

A method of manufacturing a structure according to the second embodiment of the present invention will now be described with reference to the drawings.

The method of manufacturing a structure according to this embodiment is the same as the method of manufacturing a structure according to the first embodiment except the molding step (S201) shown in FIG. 2. Therefore, the method of manufacturing a structure according to this embodiment is the same as the first embodiment except the case described below, and the description of the common points will be omitted below.

In the method of manufacturing a structure according to the first embodiment, a mixture of a resin material, which is to be impregnated into carbon fibers, and the protective filler 10e is used for the prepreg 11 stacked before pressurization and heating in the molding step (S201).

On the contrary, in the method of manufacturing a structure according to this embodiment, protective supports are disposed in multiple spots on the surface of the prepreg 11 stacked before pressurization and heating in the molding step (S201).

FIG. 6 is a cross-sectional view showing the resin layer 10a' and the carbon fiber layer 10b' of the carbon fiber composite material 10' according to this embodiment.

The resin layer 10a' of the carbon fiber composite material 10' according to this embodiment is composed of a surface protective layer 10x' that contains protective supports 10f (abrasion-resistive members), and a polishing layer 10y' that does not contain the protective supports 10f.

As shown in FIG. 6, in the surface protective layer 10x' of the carbon fiber composite material 10' according to this embodiment, columnar protective supports 10f extending in the thickness direction of the resin layer 10a' (in the vertical direction in FIG. 6) are disposed. The protective supports 10f are columnar (for example, circular cylindrical) members that have higher hardness than the abrasive grains in the abrasive. The diameter of the protective supports 10f is preferably less than or equal to 40 µm.

Like the protective filler 10e in the first embodiment, the protective supports 10f can be composed of glass, quartz, aluminum nitride, silicon carbide, or the like.

The protective supports 10f extend in the thickness direction of the resin layer 10a' and are shorter than the thickness of the resin layer 10a'. In other words, the ends of the protective supports 10f adjacent to the top surface of the carbon fiber composite material 10' are disposed inside the resin layer 10a'.

To form the resin layer 10a' containing the protective supports 10f shown in FIG. 6, protective supports 10f are disposed in multiple spots on the surface of the prepreg 11 stacked before pressurization and heating in the molding step (S201). The positions where the protective supports 10f are disposed include at least the polishing region 10c.

Further, to form the polishing layer 10y' in the top layer, a resin film (not shown in the drawing) is stacked on the top surface of the prepreg 11 before pressurization and heating in the molding step (S201).

Thus, the resin layer 10a' is cured with the multiple protective supports 10f disposed in the resin layer 10a' composed of the resin material soaked out of the prepreg 11 due to pressurization and heating in the molding step (S201).

Accordingly, the protective supports 10f are disposed in the resin layer 10a' of the carbon fiber composite material 10 molded in the molding step (S201).

As described above, in the molding step (S201), the polishing layer 10y' polished for increasing adhesion is formed in the top layer, and the surface protective layer 10x' containing the protective supports 10f that have higher hardness than the abrasive is located lower than the polishing layer 10y' such that the carbon fiber composite material 10 is protected from the abrasive.

Even if the carbon fiber composite material 10' including the resin layer 10a' shown in FIG. 6 is polished with an abrasive that has lower hardness than the protective supports 10f in the polishing step, the protective supports 10f suppress excessive abrasion of the resin layer 10a'. For example, when the resin layer 10a' having a surface S3 with asperities as shown in FIG. 6 is polished with an abrasive, the abrasive comes into contact with the protective supports 10f when abrasion reaches a surface S4. This further suppresses excessive abrasion of the resin layer 10a'.

As described above, in the method of manufacturing a structure according to this embodiment, in the molding step (S201), the columnar protective supports 10f are disposed in multiple spots on the surface of the prepreg 11 disposed in the polishing region 10c, and the prepregs 11, 12, 13, 14, 15, and 16 are cured to form the carbon fiber composite material 10'.

Thus, the surface protective layer 10x' formed with the protective supports 10f in multiple spots in the carbon fiber composite material 10 can provide protection such that carbon fibers are not exposed on the surface of the carbon fiber composite material 10' in the polishing step (S202).

Further, in the method of manufacturing a structure according to this embodiment, the length of the protective supports 10f is smaller than the thickness of the resin layer 10a'.

Thus, while abrasion of carbon fibers is prevented by the columnar protective supports 10f, the columnar abrasion-resistive members are made shorter than the thickness of the resin layer 10a' so that the resin material can be partly polished.

Third Embodiment

A method of manufacturing a structure according to the third embodiment of the present invention will now be described with reference to the drawings.

The method of manufacturing a structure according to this embodiment is the same as the method of manufacturing a structure according to the first embodiment except the molding step (S201) shown in FIG. 2. Therefore, the method of manufacturing a structure according to this embodiment is the same as the first embodiment except the case described below, and the description of the common points will be omitted below.

In the method of manufacturing a structure according to the first embodiment, a mixture of a resin material, which is to be impregnated into carbon fibers, and the protective filler 10e is used for the prepreg 11 stacked before pressurization and heating in the molding step (S201).

On the contrary, in the method of manufacturing a structure according to this embodiment, a prepreg (not shown in the drawing) composed of glass fibers impregnated with a resin material is additionally disposed in a layer higher than the prepregs 11, 12, 13, 14, 15, and 16 stacked before pressurization and heating in the molding step (S201), and a non-conductive glass fiber composite material 30 (non-conductive layer) is formed in the highest top layer of the carbon fiber composite material 10.

FIG. 7 is a cross-sectional view showing the resin layer 10a" and the carbon fiber layer 10b" of the carbon fiber composite material 10" according to this embodiment.

As shown in FIG. 7, a surface protective layer composed of the glass fiber composite material 30 is formed in a layer higher than the resin layer 10a" of the carbon fiber composite material 10" according to this embodiment.

To form the glass fiber composite material 30 in a layer higher than the resin layer 10a" as shown in FIG. 7, a prepreg (not shown in the drawing) composed of glass fibers impregnated with a resin material is disposed in a layer higher than the prepregs 11, 12, 13, 14, 15, and 16 stacked before pressurization and heating in the molding step (S201).

Thus, the glass fiber composite material 30 cured together with the carbon fiber composite material 10" is formed in a layer higher than the resin layer 10a" composed of the resin material soaking out of the prepregs 11, 12, 13, 14, 15, and 16 due to pressurization and heating in the molding step (S201).

Accordingly, the glass fiber composite material 30 is disposed in a layer higher than the resin layer 10a" of the carbon fiber composite material 10" molded in the molding step (S201).

As described above, the molding step (S201) forms the resin layer 10a" with the non-conductive glass fiber composite material 30 formed in a layer higher than the resin layer 10a" such that the carbon fiber composite material 10" is protected from the abrasive.

Even if the glass fiber composite material 30 shown in FIG. 7 is polished in the polishing step, the resin layer 10a" is not polished as long as the glass fiber composite material 30 remains, so that exposure of the carbon fiber layer 10b" is suppressed.

As described above, in the method of manufacturing a structure according to this embodiment, in the molding step (S201), the glass fiber composite material 30 is disposed in a layer higher than the resin layer 10a".

Thus, the glass fiber composite material 30 can provide protection such that the carbon fiber layer 10b" is not exposed on the surface of the carbon fiber composite material 10" in the polishing step (S202).

Although the fiber composite material is molded using prepregs in the first to third embodiments, vacuum assisted resin transfer molding (VaRTM) in which stacked fiber cloth is impregnated with a resin material for molding may be used instead.

REFERENCE SIGNS LIST

10, 10', 10" carbon fiber composite material
10a, 10a', 10a" resin layer
10b, 10b', 10b" carbon fiber layer
10c polishing region
10d bonding region
10e protective filler (abrasion-resistive member)
10f protective support (abrasion-resistive member)
10x surface protective layer
10y polishing layer
11, 12, 13, 14, 15, and 16 prepreg
20 support member (another member)
30 glass fiber composite material
100 structure

The invention claimed is:

1. A method of manufacturing a structure including a carbon fiber composite material composed of a resin material reinforced with carbon fibers, the method comprising:
a molding step of impregnating the carbon fibers with the resin material and curing the resin material for molding the carbon fiber composite material;
a polishing step of polishing a predetermined region to be polished on a surface of the carbon fiber composite material molded in the molding step, with an abrasive that has a predetermined hardness; and
a bonding step of bonding, through an adhesive, another member to a part of the predetermined region polished by the polishing step,
wherein:
in the molding step, a resin layer which is a deposition of the resin material which is soaked out by curing the resin material impregnated with the carbon fibers and a carbon fiber layer in which the carbon fibers are contained within the cured resin material are formed;
the resin layer formed in the molding step is composed of a polishing layer formed in a top layer of the carbon fiber composite material that has a hardness which is lower than the predetermined hardness and a surface protective layer that is formed in lower than the polishing layer and that protects the carbon fiber layer from the abrasive, and has a hardness which is higher than the predetermined hardness; and
in the polishing step, abrasion reaches a surface of the surface protective layer formed in lower than the polishing layer.

2. The method according to claim 1, wherein the molding step disposes, in the carbon fiber composite material, an abrasion-resistive member that has a hardness which is higher than the predetermined hardness, thereby forming the surface protective layer.

3. The method according to claim 2, wherein the molding step impregnates the resin material mixed with the abrasion-resistive member and cures the resin material, thereby molding the carbon fiber composite material, the abrasion-resistive member being particulate.

4. The method according to claim 2, wherein the molding step disposes the abrasion-resistive member in multiple spots on a surface of the carbon fibers disposed in the predetermined region to be polished and cures the resin material, thereby forming the carbon fiber composite material, the abrasion-resistive member being columnar.

5. The method according to claim 1, wherein the predetermined hardness is higher than the hardness of the resin material contained in the carbon fiber composite material formed in the molding step.

6. The method according to claim 1, wherein, in the molding step, a resin film is stacked on a top surface of the carbon fiber composite material before curing.

7. A method of manufacturing a structure including a carbon fiber composite material composed of a resin material reinforced with carbon fibers, the method comprising:
a molding step of impregnating the carbon fibers with the resin material and curing the resin material for molding the carbon fiber composite material;
a polishing step of polishing a predetermined region to be polished on a surface of the carbon fiber composite material molded in the molding step, with an abrasive that has a predetermined hardness;
a bonding step of bonding, through an adhesive, another member to a part of the predetermined region polished by the polishing step,
wherein, in the molding step, a resin layer which is a deposition of the resin material which is soaked out by curing the resin material impregnated with the carbon fibers and a carbon fiber layer in which the carbon fibers are contained within the cured resin material are formed, and in a layer which is a top layer of the carbon fiber composite material and which is higher than the resin layer, a non-conductive layer for protecting the carbon fiber layer from polishing by the abrasive in the polishing step is formed.

8. The method according to claim 7, wherein the non-conductive layer is a layer molded with a glass fiber composite material that is a resin material reinforced with glass fibers.

9. The method according to claim 8, wherein, in the molding step, the glass fibers impregnated with the resin material are disposed on a top surface of the carbon fiber composite material before curing.

* * * * *